(No Model.)
J. C. HEARAN.
MACHINE FOR SHAPING COUNTER STIFFENERS FOR BOOTS OR SHOES.
No. 348,903. Patented Sept. 7, 1886.
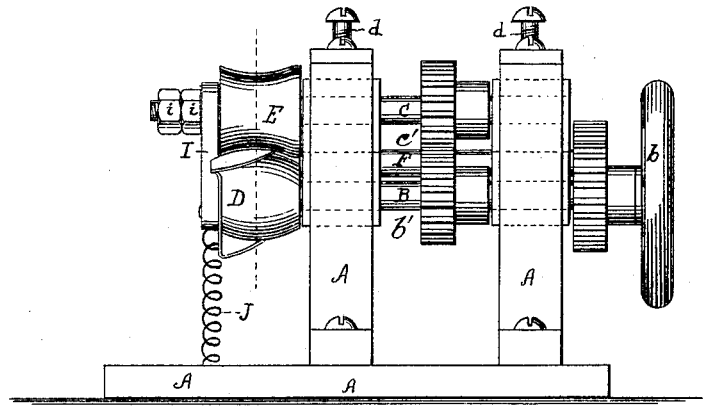
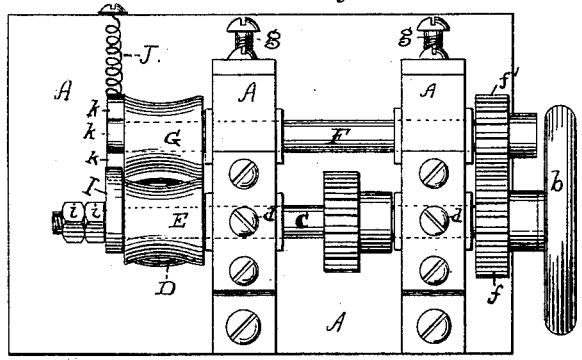
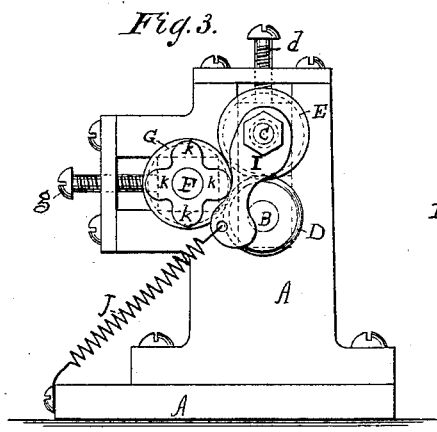
WITNESSES:
Edward Wolff
V. C. Clayton
James C. Hearan, INVENTOR,
BY J. C. Clayton, ATTORNEY.

UNITED STATES PATENT OFFICE.

JAMES C. HEARAN, OF BROOKLYN, NEW YORK, ASSIGNOR OF ONE-HALF TO JOHN M. CAVANAGH, OF SAME PLACE.

MACHINE FOR SHAPING COUNTER-STIFFENERS FOR BOOTS OR SHOES.

SPECIFICATION forming part of Letters Patent No. 348,903, dated September 7, 1886.

Application filed May 1, 1886. Serial No. 200,790. (No model.)

*To all whom it may concern:*

Be it known that I, JAMES C. HEARAN, a citizen of the United States, and a resident of Brooklyn, in the county of Kings and State of New York, have invented certain new and useful Improvements in Machines for Shaping Counters for Boots and Shoes, of which the following is a specification.

The object of my invention consists in constructing a counter-shaping machine with its parts capable of independent adjustment in forming the lower and upper members of a counter, being an improvement upon the invention covered by Letters Patent No. 302,656, granted to me July 29, 1884.

The nature of my invention consists in a device to form the lower member of the counter by means of an oscillating arm which has a spring drawing it back and cams forcing it forward against the end of a convex roller, which device and convex roller act with two concave-faced rollers and geared shafting in shaping the upper member of the counter, as will be more fully hereinafter described.

In the accompanying drawings, Figure 1 is a side elevation showing a counter passing through the shaping devices of the machine. Fig. 2 is a plan view, Fig. 3 an end view, and Fig. 4 is a cross-section, showing the devices for shaping the counter in detail. Fig. 5 represents a counter when completed by the machine.

A A A A represent the base and frame of the machine; B, the main shaft, and $b$ the driving-pulley; C, a shaft driven by gear $b'$ on main shaft, acting through gear $c'$.

D is a convex-faced roller on the outer end of the main shaft B, and above this roller D is a concave-faced roller, E, on the outer end of shaft C. The shaft B has fixed housings; but those of shaft C are adjustable and held in position when adjusted by screws $d$ $d$.

F is a shaft driven by gear $f$ on the main shaft acting through gear $f'$. The housings of shaft F are adjustable by means of screws $g$. On outer end of shaft F is a concave-faced roller, G. The function of the concave rollers E and G is to help feed in and bend the stock out of which the counter is to be formed around the upper face of roller D while shaping the upper member of the counter. The three rollers also conjointly assist in feeding in the moist and pliable stock, so as to enable the arm I (which oscillates on the outer end of shaft C) to turn the stock down at right angles over the end of roller D and form the lower member of the counter. Through means of nuts $i$ $i$, Fig. 2, arm I is regulated as to its distance from the ends of the rollers, and thereby determine the size of the lower member of the counter. The spring J, secured at one end to the base A, steadily pulls the arm I away from the roller D in a direction at right angles to the shafting, while the cams $k$ $k$ $k$ $k$ on the outer end of roller G (see Figs. 2 and 3) intermittently force the arm I toward roller D. This causes an oscillating motion to the arm, whereby the lower member of the counter is crimped and turned down over the end of roller D, as shown in Fig. 1. The machine having been set in motion, a piece of moist and pliable leather stock, cut to the size desired for a counter, is fed in between the rollers D and E, which turn it toward roller G, and that roller takes hold of the leather and helps compress and shape the upper member of the counter, the counter being made to coil around into the required shape. The stock out of which the counter is to be formed is fed in between the rollers with one edge projecting out from the ends of the rollers a distance equal to the width required for the lower member of the counter. The arm I and roller E having been adjusted to allow for the thickness of the leather in the counter, the rollers feed the counter in, and shape the upper member of it between their faces, while the lower member of the counter is formed by the oscillating arm turning down and crimping the edge of the stock projecting out from the ends of the rollers, the lower member being formed between the arm I and roller D. (See Fig. 1.) I regard this crimping motion of arm I as of great importance. The number and shortness of the crimps depends mainly upon the number and size of the cams $k$, whose number and size may be varied, if desired.

What I claim as new, and desire to secure by Letters Patent, is—

The combination of the rollers D E G and arm I with spring J and cams $k$, when constructed and operating substantially in the manner and for the purposes set forth.

Signed at Brooklyn, in the county of Kings and State of New York, this 24th day of April, A. D. 1886.

JAMES C. HEARAN.

Witnesses:
JAS. CAVANAGH,
THOMAS KELLY.